T. H. SYMINGTON.
DRAFT GEAR.
APPLICATION FILED OCT. 26, 1907.
942,948.
Patented Dec. 14, 1909.
3 SHEETS—SHEET 1.
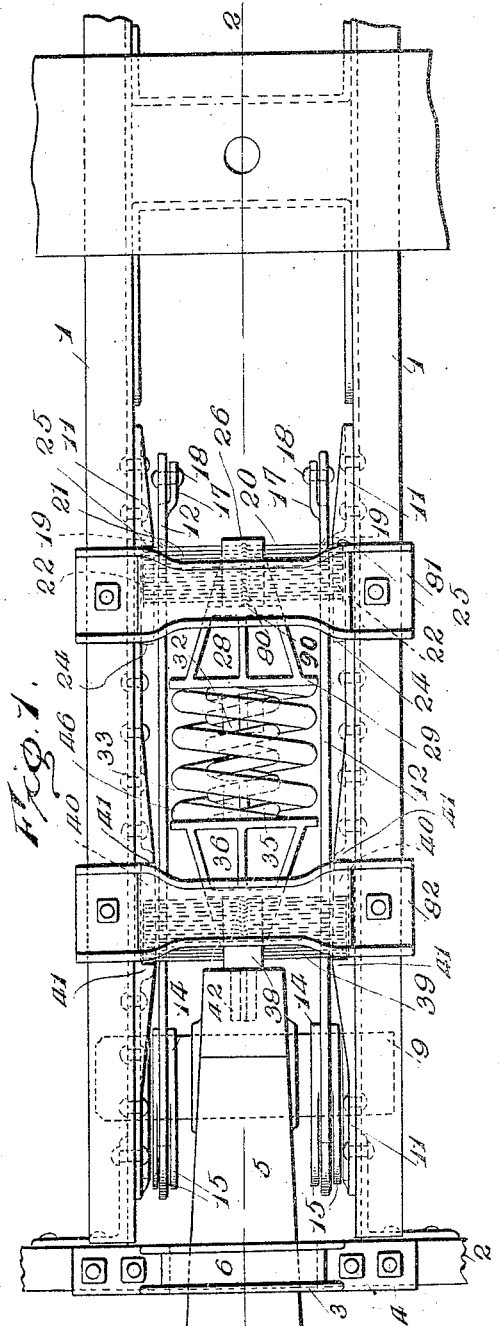
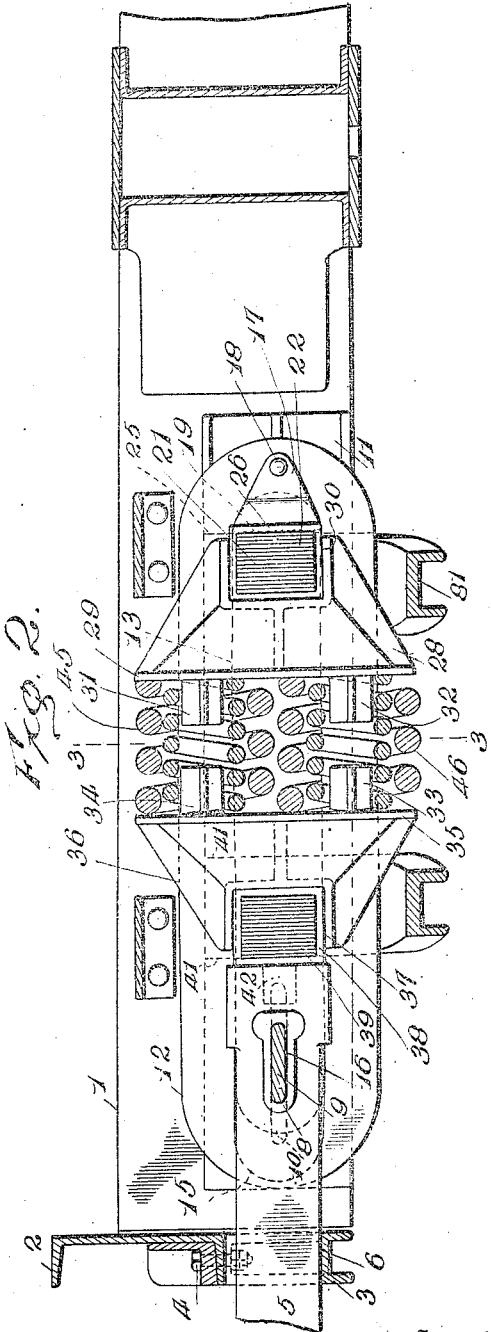
Inventor
T. H. Symington

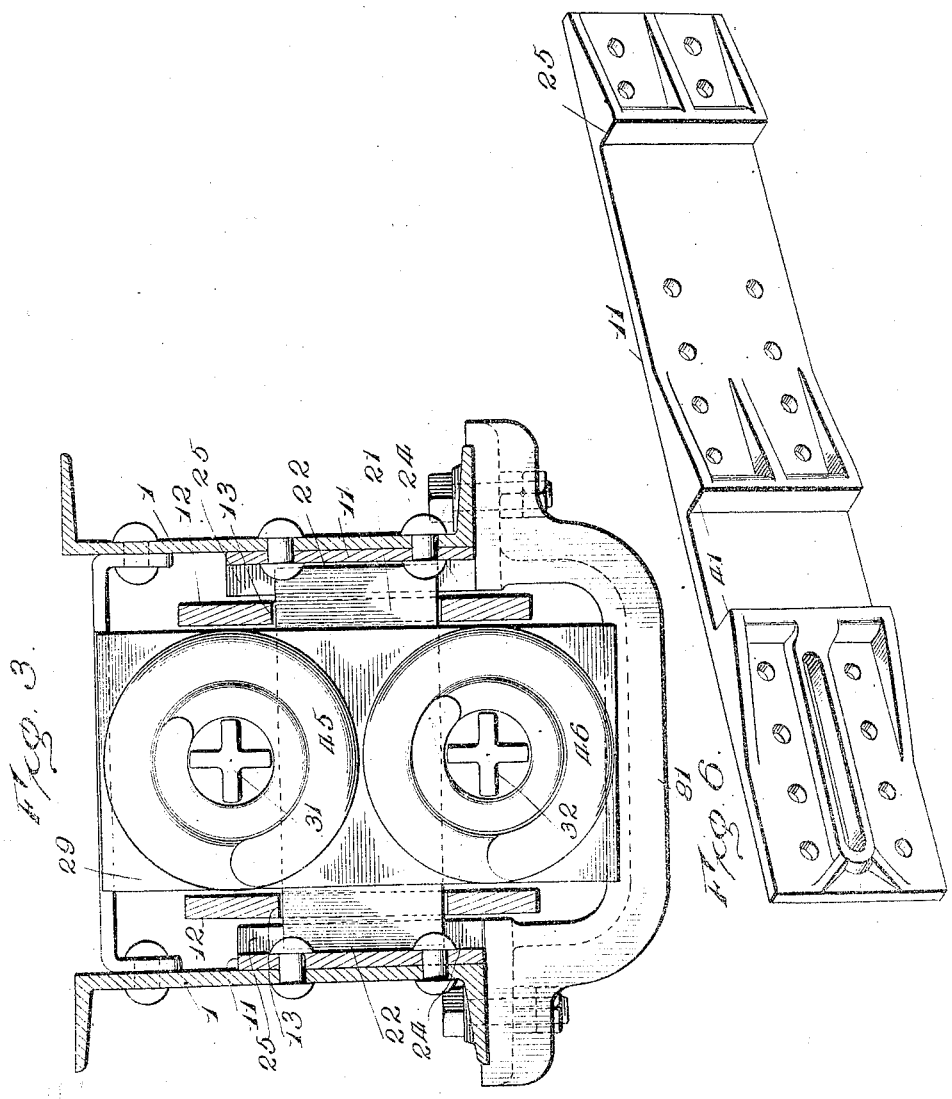

T. H. SYMINGTON.
DRAFT GEAR.
APPLICATION FILED OCT. 26, 1907.
942,948.
Patented Dec. 14, 1909.
3 SHEETS—SHEET 3.
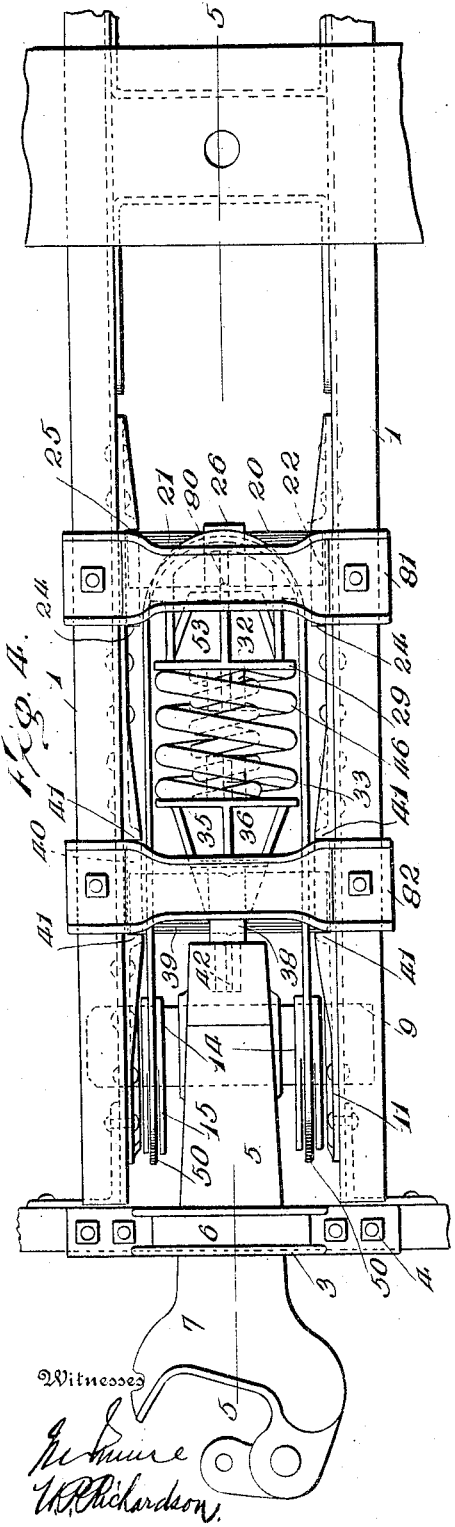
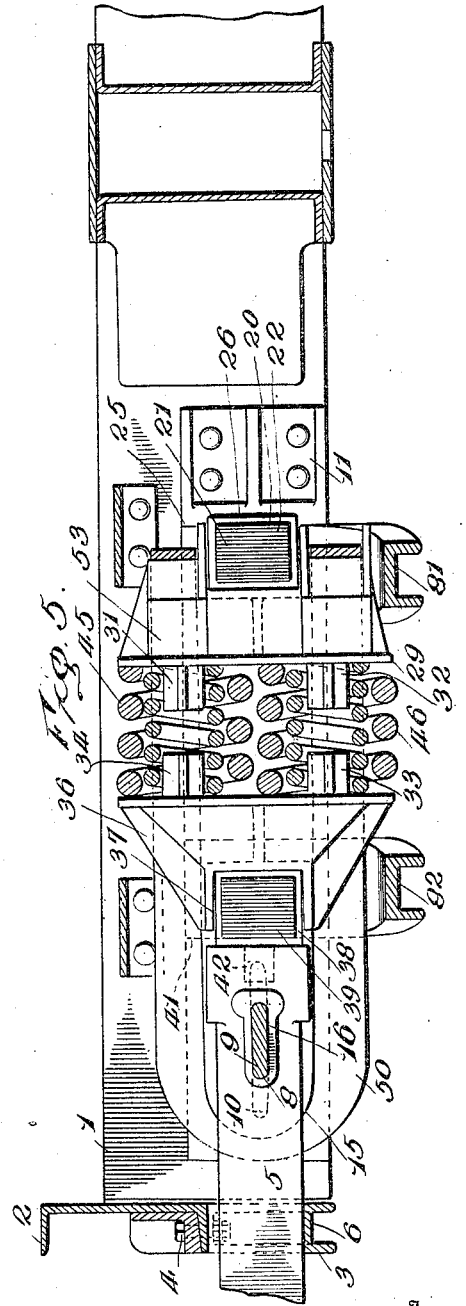
Inventor
T. H. Symington
Witnesses
By Stewart & Stewart
Attorney

UNITED STATES PATENT OFFICE.

THOMAS HARRISON SYMINGTON, OF BALTIMORE, MARYLAND.

DRAFT-GEAR.

942,948. Specification of Letters Patent. Patented Dec. 14, 1909.

Application filed October 26, 1907. Serial No. 399,327.

*To all whom it may concern:*

Be it known that I, THOMAS HARRISON SYMINGTON, a citizen of the United States of America, residing in the city of Baltimore and State of Maryland, have invented certain new and useful Improvements in Draft-Gear, of which the following is a specification.

The present invention relates to draft gears for rolling stock, and particularly to draft gears of that type, which have a plurality of followers or sliding members, abutments with which the followers coöperate in transmitting draft and bumping stresses to the vehicle, and resilient connections between the followers.

The invention herein set forth contemplates the provision of resilient transverse members or cross bars, by means of which draft and bumping stresses are communicated from the draw bar to the vehicle. Resilient members of less resistance than the cross bars are interposed between the latter, so that the initial or lesser stresses are taken up by the intermediate resilient members, while final or greater stresses are taken up by the transverse members. The transverse members are herein shown as composed of a plurality of leaf springs, and helical springs form the resilient connections between the followers. The details of preferred forms of my device, constituting embodiments of these and other improvements included in my invention are hereinafter described and illustrated in the accompanying drawings of which,—

Figure 1 is a bottom plan of the draft gear. Fig. 2 is a longitudinal sectional elevation taken on the line 2—2 of Fig. 1, but showing the draw bar in elevation. Fig. 3 is a transverse section on the line 3—3 of Fig. 2. Fig. 4 is a bottom plan of another embodiment of my invention. Fig. 5 is a longitudinal section of this embodiment taken on the line 5—5 of Fig. 4 showing the central members in elevation. Fig. 6 is a perspective of a cheek plate.

Referring to Figs. 1, 2 and 3, the draft gear frame is formed of parallel channel bars (1) secured to the body of the vehicle and extending longitudinally thereof. Disposed transversely of the frame at its extremity, and secured rigidly thereto is a channel bar (2). A depending bearing member (3) is attached to the channel bar (2) by means of bolts (4). This bearing supports the draw bar (5), which slides on the upwardly disposed surface (6) of the bearing member. A certain amount of vertical play is allowed, indicated by the space shown in Fig. 2 between the draw bar and the transverse channel (2). At its outer extremities the draw bar is provided with the usual coupling head or hook (7) and extending through the draw bar on the opposite side of the bearing is a horizontal transverse aperture (8) in which is a key (9). This key is shown as of oblong transverse cross section, which gives it great rigidity in the direction of the draft of the vehicle, and is of sufficient length to extend beyond the draw bar on both sides. The cheek plates (11) are secured by any convenient means as bolts or rivets to the inner faces of the channel bars. The extremities of the key are adapted to slide in the elongated slots (10) formed in the cheek plates, and extending through the channel bars (1). On each side of the draw bar between the draw bar and the plates are links (12) having transverse openings (13). In the ends of the openings (13) at the adjacent extremities of the links are filler plates (14), each of which is provided with two flanges (15), which engage the lateral faces of the links. The filler plates fit the ends of the openings, and are restrained from lateral movement by the flanges. The slots (16) in the filler plates are adapted to receive the key (9).

It is apparent from the above description, that a stress of tension in the draw bar would be transmitted to the links by the means of the key, but in response to a stress of compression in the draw bar the key and filler plate slide in the aperture (13) in the link, so that no compression stress is imparted to the links.

The openings (13) at the ends of the links remote from the draw bar are provided each with a filler member or plate (17) secured thereto by a pin or bolt (18). This filler member is provided with a flat bearing surface (19) disposed toward the draw bar, and adapted to engage the outer member (20) of a series of parallel superimposed leaf springs (21). The leaf springs are each provided with a centrally located transverse tongue and groove (80) for the purpose of nesting. The springs are bound together by the band (26), which is provided with a tongue 90 which engages the groove in the adjacent spring. This multiple spring forms a secondary spring, and is hereinafter termed a "cross bar". The ends (22) of the multiple spring are adapted to slide relatively to the face of the cheek plate (11), and are guided and supported by horizontally disposed ways formed by ledges (24) on the transverse yoke (81). At the end of the way (24) remote from the draw bar is a ledge (25) on the cheek plate vertically disposed, forming what will hereinafter be termed a "single abutment". The multiple spring or cross bar (21) carries a follower (28) provided with a vertical transversely extending plate (29), and a rectangular socket (30) open at the side remote from the draw bar; this socket incloses the band (26) of the cross bar, so that the follower is supported by the cross bar. Parallel stops (31—32) extending longitudinally of the vehicle in the same vertical plane are formed integral with the plate (29), and extend in the direction of the draw bar. Corresponding stops (33—34) extend from the neighboring face of a plate (35) mounted on a follower (36) similar to the follower (28) previously described. The ends of these stops are spaced a suitable distance to be hereinafter determined.

Interposed between the parallel transverse plates (29 and 35) and surrounding the coöperating stops 31—34 and 32—33 are the primary springs composed of double helical compression springs (45—46) which act to maintain the followers in normal position. These springs combined are of less capacity than either of the secondary springs. The follower (36) is provided with a rectangular socket (37) similar to socket 30 of the follower 28. This socket receives a band (38) inclosing a multiple spring or cross bar (39) similar to the spring (21); the cross bar (39) moves relatively to the cheek plates (11) and is guided and supported by ways (40) on the yoke (82) similar to the ways (24) previously described. At the ends of the ways (40) are parallel vertically extending double abutments (41) on the cheek plate (11) spaced a distance apart determined by conditions of operation. In the structure shown, the distance between the abutments exceeds the width of the cross bar (39) by an amount equal to the distance between the ends of the stops 31—34 and 32—33. The band (38) is provided on its face, which is disposed toward the draw bar with a projection (42) which engages a longitudinally extending opening in the end of the bar. This permits stresses of compression in the draw bar to be transmitted directly to the cross bar (39).

In the operation of the device the draw bar is placed under tension as by the starting of the vehicle the stress is communicated to the key (9), which acting through the filler plate communicates to the two links (12) a stress the total of which is equal to that placed on the bar. The tension in the links is communicated to the cross bar (21) upon the extremities of which they act through the filler plates (17). The cross bar is engaged intermediately by the band (26) which rests on the follower (28). This follower is maintained in its normal position as shown by the springs 45 and 46, but in response to the tension placed on the draw bar these springs yield and the cross bar (21) slides on the horizontal ways (24) and if the force applied is sufficient, advances the follower until the stops (31—32) engage the ends of the corresponding stops (33—34). The stress which has up to this time been equalized by springs 45 and 46, and transmitted by them to the follower (36), is now transmitted positively from the follower (28) through the stops 31—32 to the stops 33—34, and to the follower 36. It should be borne in mind that the cross bar (21) does not yield to slight or initial stress. As it is free to slide, the stress is communicated to the intermediate spiral springs (45—46) and from there to the central point of the multiple spring (39). This spring also does not yield to slight or initial stress, but communicates the tension directly to the abutments (41). When a final or intense stress is applied, the springs (45—46) by yielding permit the stops 31—32 and 33—34 to come into contact with each other, so that there is a rigid connection for compression between the intermediate points of the cross bars. The tension on the draw bar applied first to the extremities of the remote multiple spring or cross bar (21) is communicated from its intermediate point to an intermediate point of the neighboring multiple spring or cross bar (39), and from the extremities of this cross bar to a fixed point on the vehicle. As there are no abutments on the vehicle to receive tension stress applied to the remote cross bar, the entire stress of tension is communicated through the first cross bar (39) to the vehicle. By this arrangement we have slight or initial stresses taken up by the spiral springs, and intense or final stresses taken up by the multiple springs or cross bars. Under a stress of compression the draw bar acts directly on the follower (36), advancing it against the resistance of the springs 45—46; this causes the ends of the multiple spring (39) to slide along the ways (40) until they come in contact with the abutments (41). As the space between the abutments (41) at each end of the multiple spring exceeds the width of that spring by a distance substantially equal to the distance between the stops 31—34 and 32—33, it is apparent that simultaneously with the contact of the spring (39) with the abutment (41) the ends of these stops will be brought into engagement with each other. In this position of the mechanism there is a rigid connection for purposes of compression between the intermediate points of the springs (21 and 39) and the end of the draw bar, and the extremities of both springs engage abutments on the vehicle. While initial stresses of compression are taken up by the helical springs and transmitted to the remote cross bar, and by it to the vehicle, final or intense stresses of compression are taken up by the combined multiple springs and transmitted by each to the vehicle.

Referring to Figs. 4 and 5 it will be noted that instead of the two links (12) as shown in Fig. 1, there is a single U-shaped link (50) as seen particularly in Fig. 4, which incloses the end of the draw bar, one arm of the U extending between the bar and the bearing plates at each side of the former, and engaging the key (9) by means of filler plates (14) as previously described. The curved portion of the U remote from the draw bar, instead of engaging the cross bar or multiple spring (21), as in the modification just described, bears on the rear end of the follower (53). Aside from this variation, the modification shown in Figs. 4 and 5 is similar to Figs. 1, 2 and 3.

The operation of this device under compression stress is the same as that of the device previously described. When tension is applied to the draw bar, instead of being communicated by the links to the extremities of the remote multiple spring (21), as in the other modification, this stress is transmitted by the link directly to the remote follower (53) and by the follower to the helical springs 45—46. If the stress is sufficient, the stops 31—34 and 32—33 are brought into engagement with each other, and the follower (53) engages the follower (36) positively and a rigid connection is established between the remote extremity of the link and the center of the spring or cross-bar (39), so that in this device initial or slight stresses are taken up by the helical or primary springs (45—46), while final or intense stresses are taken up by the multiple or secondary spring (39). As herein used the term "initial stress" designates a stress insufficient to bring the follower stops into contact, while any stress greater than this is a final stress.

Having thus set forth the details of various preferred modifications of my invention, I do not limit myself to these details, but claim and desire to secure by Letters Patent:

1. In a draft gear for rolling stock, a draw-bar, a plurality of resilient cross-bars coöperating with the draw bar to transmit stress therefrom to the vehicle, single abutments coöperating with one of the cross-bars whereby stresses of compression only are transmitted directly from this cross-bar to the vehicle, double abutments coöperating with the other cross-bar whereby stresses both of compression and tension are transmitted directly to the vehicle from this cross-bar, a stop between the cross-bars, and means for applying stress of tension in the draw-bar to the first mentioned cross-bar at points remote from the said stop whereby such stress is transmitted through this cross-bar and communicated by said stop to the other cross-bar through which such stress is transmitted to the vehicle.

2. In a draft gear for rolling stock, a draw bar, a plurality of resilient cross bars, means for transmitting stress from the draw bar to the extremities of one cross bar, means for communicating the stress from a point intermediate of that cross bar to another cross bar, and means at the extremities of the latter whereby the stress is communicated to the vehicle.

3. In a draft gear for rolling stock, a draw bar, a plurality of resilient cross bars, means for transmitting stress from the draw bar to the extremities of one cross bar, means for communicating stress from a point intermediate of that cross bar to another cross bar, consisting of resilient members and a coöperating stop and means at the extremity of the latter cross bar by which the stress is transmitted to the vehicle.

4. In a draft gear for rolling stock, a draw bar, a plurality of resilient cross bars, means for transmitting stress from the draw bar to the extremities of one cross bar, means for communicating initial stress from a point intermediate of that cross bar to another cross bar, consisting of resilient members, and means for communicating final stresses from a point intermediate of the first cross bar to the second cross bar, including a stop and means at the extremities of the second cross bar, by which stress is transmitted to the vehicle.

5. In a draft gear for rolling stock, a draw bar, a plurality of resilient cross bars, means for transmitting compression stress from the draw bar to one cross bar, means for transmitting part of this stress to the vehicle, and the remainder through another cross bar to the vehicle, means for transmitting all of the tension in the draw bar to the extremities of one cross bar, means consisting of a resilient member, and a coöperating stop for communicating stress from a point intermediate of that cross bar to another cross bar, and means at the extremity of the latter by which the stress is communicated to the vehicle.

6. In a draft gear for rolling stock, a draw bar, a plurality of cross bars and means for connecting the cross bars, including a link and a sliding filler plate and means on the vehicle adapted to coöperate with the cross bars to take up stress applied to the draw bar and transmit it to the vehicle.

Signed by me at Baltimore, Maryland this 24th day of October 1907.

THOMAS HARRISON SYMINGTON.

Witnesses:
J. MERCER GARNETT, Jr.,
A. H. WESTON.